United States Patent [19]

Ikemura et al.

[11] Patent Number: 4,682,210
[45] Date of Patent: Jul. 21, 1987

[54] AUTOMATIC WHITE BALANCE ADJUSTING CIRCUIT FOR IMAGE PICKUP DEVICE

[75] Inventors: Yuichi Ikemura, Nagareyama; Hiroshi Takano, Iwai, both of Japan

[73] Assignee: Victor Company of Japan, Ltd., Kanagawa, Japan

[21] Appl. No.: 846,572

[22] Filed: Mar. 31, 1986

[30] Foreign Application Priority Data

Apr. 5, 1985 [JP] Japan .................................. 60-71934

[51] Int. Cl.$^4$ .............................................. H04N 9/73
[52] U.S. Cl. ...................................................... 358/29
[58] Field of Search ........................................ 358/29 C

[56] References Cited

U.S. PATENT DOCUMENTS

| 4,584,598 | 4/1986 | Kutaragi | 358/29 C |
| 4,605,955 | 8/1986 | Hashimoto | 358/29 C |
| 4,616,253 | 10/1986 | Hashimoto | 358/29 C |

FOREIGN PATENT DOCUMENTS

| 3322835 | 12/1983 | Fed. Rep. of Germany | 358/29 C |
| 55-110486 | 8/1980 | Japan | 358/29 C |

Primary Examiner—Michael A. Masinick
Attorney, Agent, or Firm—Ladas & Parry

[57] ABSTRACT

An automatic white balance adjusting circuit comprises a color temperature detecting circuit for producing a detection signal having a voltage in correspondence with a color temperature of an incoming light to an image pickup device, a reference voltage signal generating circuit for generating an A.C. reference voltage signal, a comparing circuit for obtaining a discrimination signal by comparing the detection signal with the reference voltage signal, a plurality of voltage sources for applying different voltages in correspondence with different color temperatures, a selecting circuit for selecting and obtaining voltages from the voltage sources depending on the output discrimination signal of the comparing circuit, and an integrating circuit for integrating output voltage signals of the selecting circuit. Output voltage signals of the integrating circuit are applied to corresponding amplifiers to variably control amplifications thereof so that a white balance of a color video signal produced from an encoder is automatically adjusted.

8 Claims, 8 Drawing Figures

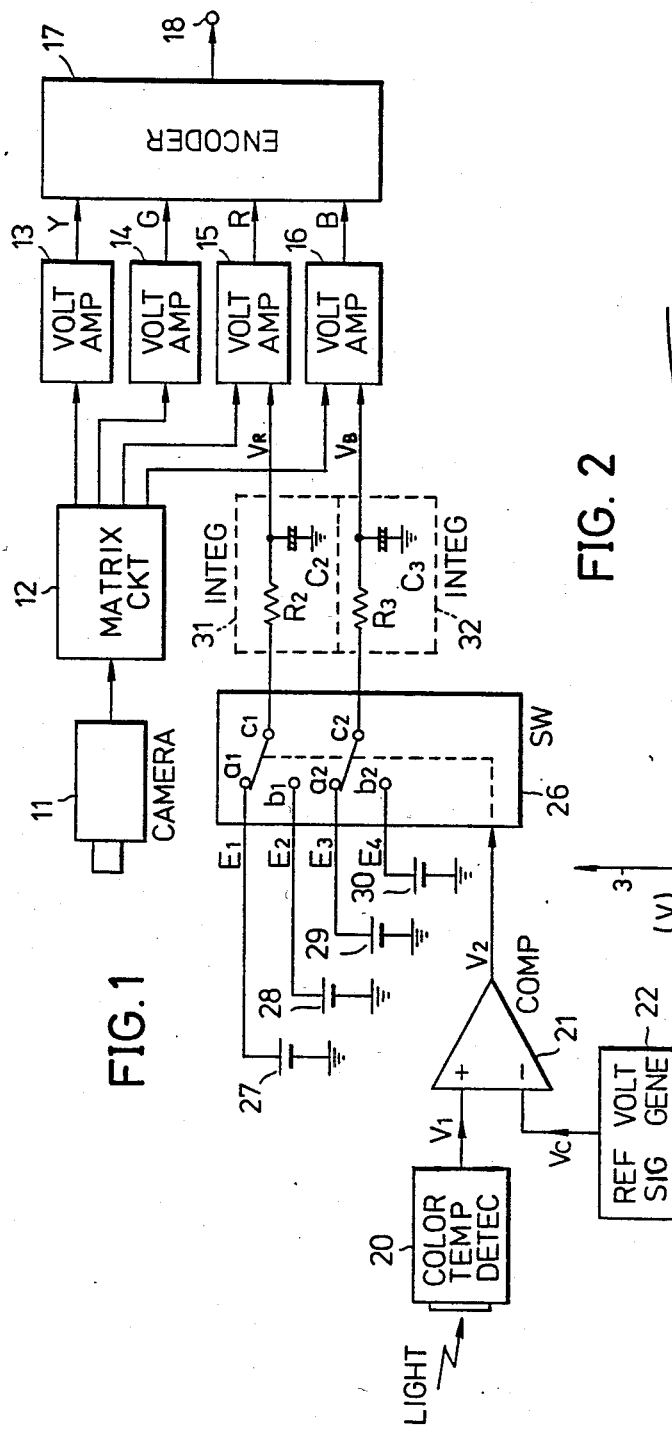
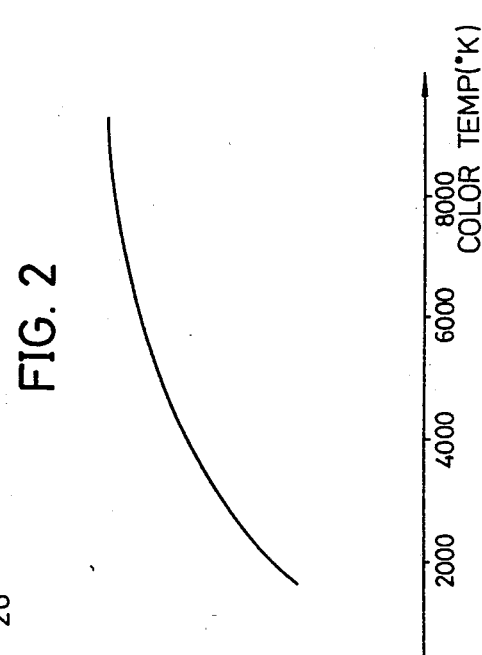
FIG. 1
FIG. 2

AUTOMATIC WHITE BALANCE ADJUSTING CIRCUIT FOR IMAGE PICKUP DEVICE

BACKGROUND OF THE INVENTION

The present invention generally relates to automatic white balance adjusting circuits for image pickup devices, and more particularly to an automatic white balance adjusting circuit for an image pickup device, in which the white balance is automatically adjusted by varying amplifications of amplifiers with respect to primary color signals which are obtained by picking up an image depending on a signal obtained from a color temperature detector.

A conventional automatic white balance adjusting circuit for a color image pickup device has the following circuit construction. That is, an image pickup signal which is obtained by picking up an object by a color video camera is separated into a luminance signal Y and three primary color signals of green (G), red (R) and blue (B) in a matrix circuit. The luminance signal Y and the three primary color signals G, R and B are independently amplified in respective voltage amplifiers and are supplied to an encoder which produces from these signals a color video signal in conformance with the NTSC system, for example. This output color video signal of the encoder is outputted via an output terminal.

On the other hand, an output detection voltage of a color temperature detector is supplied to the voltage amplifier for the primary color signal R via a non-inverting amplifier to vary an amplification thereof on one hand, and is supplied to the voltage amplifier for the primary color signal B via an inverting amplifier to vary an amplification thereof on the other. The amplification of the voltage amplifier for the primary color signal R is varied depending on a control voltage from the non-inverting amplifier having a characteristic in accordance with a characteristic of the output detection voltage of the color temperature detector. The amplification of the voltage amplifier for the primary color signal B is varied depending on a control voltage from the inverting amplifier having a characteristic which is an inverse of the characteristic of the output detection voltage of the color temperature detector. Hence, in the case where the color temperature of the object which is picked up is low, that is, in the case where the energy of the long wavelength wave is large and the energy of the short wavelength wave is small, for example, the amplification of the primary color signal B is made large and the amplification of the primary color signal R is made small so as to automatically adjust the white balance of the color video signal which is outputted via the output terminal.

Generally, when picking up an image outdoors on a clear day, the color temperature setting of the color video camera must be fixed to approximately 5500° to 6500° K. However, when picking up an image against the sunlight, although the object has a color temperature of approximately 6500° K. and thousands of lux, the sunlight having a color temperature of approximately 5500° K. and tens of thousands of lux enters a sensor of the color temperature detector. In this case, according to the color video signal which is obtained from the conventional automatic white balance adjusting circuit, the face of the person who is picked up by the image pickup device will look pale. On the other hand, when picking up an image from a low angle, the sensor of the color temperature detector will detect the color temperature of the blue sky and the face of the person will look reddish. Furthermore, in the case where the person who is to be picked up by the image pickup device wears a blue suit and the illumination is a reddish light having a color temperature of 3000° K., the face of the person will look reddish, and there is a disadvantage in that the conventional automatic white balance adjusting circuit cannot perform a satisfactory adjustment of the white balance.

Accordingly, the present inventors have previously proposed an automatic white balance adjusting circuit in a Japanese Patent Application No. 60-46273 filed Mar. 8, 1985. This previously proposed automatic white balance adjusting circuit comprises a color temperature detecting circuit for producing a detection signal having a value in correspondence with a color temperature of an incoming light to the image pickup device, a comparing circuit for obtaining a discrimination signal by comparing the detection signal with a reference D.C. voltage, and a selecting circuit for selecting and obtaining a color temperature setting signal having a value in correspondence with the discrimination signal. The white balance is automatically adjusted by varying the amplifications with respect to the primary color signals depending on the value of the color temperature setting signal.

According to the previously proposed automatic white balance adjusting circuit, the color reproducibility of the picture which is obtained by picking up an image under illuminations having color temperatures of 3200° K. and 5600° K. is stable and satisfactory. However, there is a problem in that the color reproducibility is poor when the image is picked up under an illumination of a fluorescent light such as a white light having a color temperature of 3800° K. an a daylight (white light) having a color temperature of 5000° K., and a mixed light source comprising an incandescent lamp and a fluorescent lamp, for example. In other words, the color reproducibility is poor when the image is picked up under an illumination of a light source having an intermediate color temperature between 3200° K. and 5600° K.

SUMMARY OF THE INVENTION

Accordingly, it is a general object of the present invention to provide a novel and useful automatic white balance adjusting circuit for image pickup device, in which the disadvantages of the conventional circuit are eliminated and the problems of the previously proposed circuit are overcome.

Another and more specific object of the present invention is to provide an automatic white balance adjusting circuit comprising color temperature detecting circuit means for producing a detection signal having a voltage in correspondence with a color temperature of an incoming light to an image pickup device, reference voltage signal generating circuit means for generating an A.C. reference voltage signal, comparing circuit means for obtaining a discrimination signal by comparing the detection signal with the reference voltage signal, a plurality of voltage signal means for applying different voltages in correspondence with different color temperatures, selecting circuit means for selecting and obtaining voltages from the voltage source means depending on the output discrimination signal of the comparing circuit means, and integrating circuit means for integrating output voltage signals of the selecting circuit means. Output voltage signals of the integrating circuit means are applied to corresponding ones of amplifier means to variably control amplifications thereof so that a white balance of a color video signal produced from an encoder is automatically adjusted. According to the automatic white balance adjusting circuit of the present invention, the amplifications of primary color signals are constant values for the low and high color temperatures, and the amplifications of the primary color signals are values proportional to the color temperature for the intermediate color temperatures. For this reason, the color is natural and stable regardless of the illumination under which the image is picked up by the image pickup device. The color reproducibility is satisfactory and the color of the picture is natural and stable even when the image is picked up under a fluorescent light.

Other objects and further features of the present invention will be apparent from the following detailed description when read in conjunction with the accompanying drawings.

BRIEF DESCRIPTION OF THE DRAWINGS

FIG. 1 is a system block diagram showing a first embodiment of the automatic white balance adjusting circuit according to the present invention;

FIG. 2 is a graph showing a color temperature versus detection voltage characteristic of a color temperature detector within the block system shown in FIG. 1;

DETAILED DESCRIPTION

Figure 3:
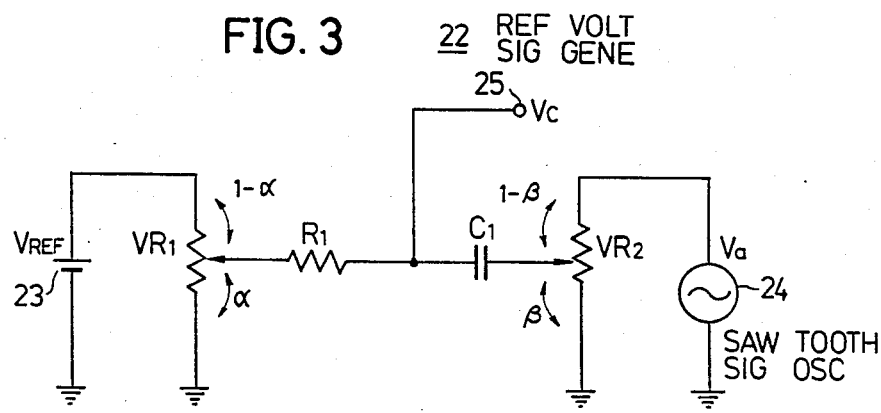
FIG. 3 is a system block diagram showing an embodiment of a reference voltage signal generating circuit within the block system shown in FIG. 1.

In FIG. 1, an image pickup signal which is obtained from a camera tube of a color video camera 11 by picking up an image is separated into a luminance signal Y and three primary color signals of green (G), red (R) and blue (B) in a matrix circuit 12. The luminance signal Y and the primary color signals G, R and B are supplied to respective voltage amplifiers 13, 14, 15, and 16 wherein the signals are independently amplified. Output signals of the voltage amplifiers 13 through 16 are supplied to an encoder 17 which produces from these signals a color video signal which is in conformance with the NTSC system, for example. The output color video signal of the encoder 17 is outputted via an output terminal 18.

A color temperature detector 20 provided in a vicinity of the camera tube has a color temperature versus detection voltage characteristic shown in FIG. 2. An output detection voltage V1 of the color temperature detector 20 is supplied to a non-inverting input terminal of a comparator 21. An A.C. reference voltage signal Vc from a reference voltage signal generating circuit 22 is supplied to an inverting input terminal of the comparator 21.

The reference voltage signal generating circuit 22 has a construction shown in FIG. 3. In FIG. 3, an output voltage $V_{REF}$ of a D.C. voltage source 23 is applied to a variable resistor VR1, and a divided voltage from a slider of the variable resistor VR1 is supplied to a resistor R1. A sawtooth wave signal Va from a sawtooth wave signal oscillator 24 is applied to a variable resistor VR2, and a divided voltage from a slider of the variable resistor VR2 is supplied to a capacitor C1 wherein a D.C. component is eliminated. The output sawtooth wave signal Va of the sawtooth wave signal oscillator 24 is an A.C. distorted wave.

When it is assumed that a ratio between a resistance from the slider of the variable resistor VR1 to the D.C. voltage source 23 and a resistance from the slide of the variable resistor VR1 to ground is $1-\alpha:\alpha$ and a ratio of a resistance from the slider of the variable resistor VR1 to the sawtooth wave signal oscillator 24 and a resistance from the slide of the variable resistor VR1 to ground is $1-\beta:\beta$, the A.C. (sawtooth wave) reference voltage signal Vc which is obtained from a connection point of the resistor R1 and the capacitor C1 via an output terminal 25 can be described by the following equation (1).

$$Vc = \alpha \cdot V_{REF} + \beta \cdot Va \qquad (1)$$

In other words, the D.C. level of the reference voltage signal Vc is varied by the variable resistor VR1, and the peak-to-peak value of the reference voltage signal Vc is varied by the variable resistor VR2. The reference voltage signal Vc from the output terminal 25 is applied to the inverting input terminal of the comparator 21.

Figure 4:
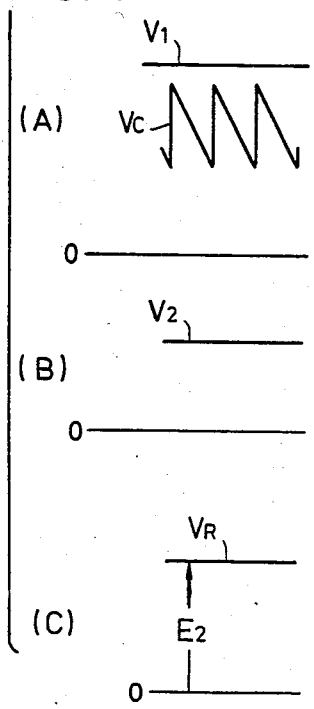
FIGS. 4(A) through 4(C), FIGS. 5(A) through 5(C), and FIGS. 6(A) through 6(C) respectively show signal voltages at parts of the block system shown in FIG. 1 when an output detection voltage of the color temperature detector has a value different from a reference voltage.
Figure 5:
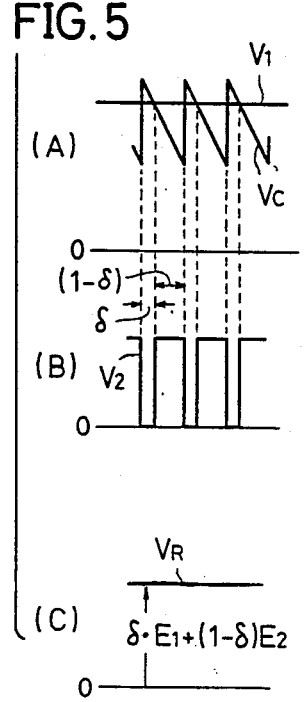
Figure 6:
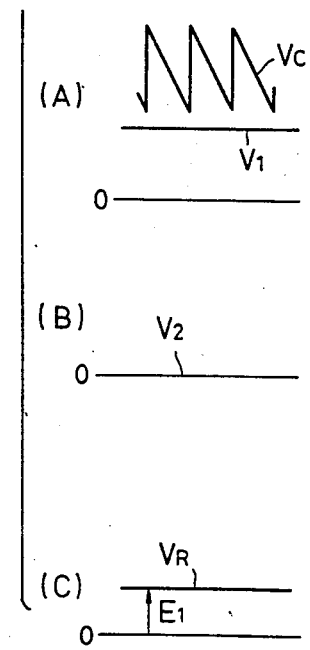

In the case where the output detection voltage V1 of the color temperature detector 20 is greater than a maximum value of the reference voltage signal Vc as shown in FIG. 4(A), an output discrimination signal V2 of the comparator 21 constantly has a high level as shown in FIG. 4(B). In the case where the output detection voltage V1 of the color temperature detector 20 is between maximum and minimum values of the reference voltage signal Vc as shown in FIG. 5(A), the output discrimination signal V2 of the comparator 21 has a pulse waveform as shown in FIG. 5(B). A duty ratio $(2-\delta)$ of the discrimination signal V2 changes depending on the level of the detection voltage V1 with respect to the reference voltage signal Vc. In addition, in the case where the output detection voltage V1 of the color temperature detector 20 is smaller than the miminum value of the reference voltage signal Vc as shown in FIG. 6(A), the output discrimination signal V2 of the comparator 21 constantly has a low level (zero volt) as shown in FIG. 6(B).

The output discrimination signal V2 of the comparator 21 is supplied to a switching control terminal of a switching circuit 26. A predetermined voltage E1 which is obtained from a voltage source 27 and is in correspondence with the primary color signal R having a color temperature of 3200° K. is applied to a terminal a1 of the switching circuit 26. A predetermined voltage E2 which is obtained from a voltage source 28 and is in correspondence with the primary color signal R having a color temperature of 5600° K. is applied to a terminal b1 of the switching circuit 26. This voltage E2 is greater than the voltage E1. A predetermined voltage E3 which is obtained from a voltage source 29 and is in correspondence with the primary color signal B having a color temperature of 3200° K. is applied to a terminal a2 of the switching circuit 26. A predetermined voltage E4 which is obtained from a voltage source 30 and is in correspondence with the primary color signal B having a color temperature of 5600° K. is applied to a terminal b2 of the switching circuit 26. This voltage E4 is smaller than the voltage E3. During a low-level period of the discrimination signal V2, the switching circuit 26 connects a terminal c1 to the terminal a1 and connects a terminal c2 to the terminal a2. On the other hand, during a high-level period of the discrimination signal V2, the switching circuit 26 connects the terminal c1 to the terminal b1 and connects the terminal c2 to the terminal b2.

A voltage obtained from the terminal c1 of the switching circuit 26 is converted into a signal having an average D.C. level in an integrating circuit 31 which comprises a resistor R2 and a capacitor C2. An output signal of the integrating circuit 31 is supplied to a control terminal of the voltage amplifier 15 for the primary color signal R as a control voltage $V_R$ which is essentially a color temperature setting signal. Similarly, a voltage obtained from the terminal c2 of the switching circuit is passed through an integrating circuit 32 which comprises a resistor R3 and a capacitor C3. An output signal of the integrating circuit 32 is supplied to a control terminal of the voltage amplifier 16 for the primary color signal B as a control voltage $V_B$ which is essentially a color temperature setting signal.

For example, when the detection voltage V1 is as shown in FIG. 4(A), the control voltage $V_R$ has the voltage E2 as shown in FIG. 4(C), and the control voltage $V_B$ has the voltage E3. On the other hand, when the detection voltage V1 is as shown in FIG. 5(A), the control voltage $V_R$ has a voltage $[\delta \cdot E1 + (1-\delta) \cdot E2]$ as shown in FIG. 5(C), and the control voltage $V_B$ has a voltage $[\delta \cdot E3 + (1-\delta) \cdot E4]$. Furthermore, when the detection voltage V1 is as shown in FIG. 6(A), the control voltage $V_R$ has a voltage E1 as shown in FIG. 6(C), and the control voltage $V_B$ has a voltage E4.

The color temperature detector 20 produces a detection voltage V1 shown in FIG. 7(A). A characteristic of this detection voltage V1 with respect to the change in the color temperature is identical to the characteristic shown in FIG. 2. When a reference voltage signal Vc shown in FIG. 7(A) is set with respect to the detection voltage V1, a relationship between the color temperature and the control voltage $V_R$ becomes as indicated by a solid line in FIG. 7(B). That is, the control voltage $V_R$ has a constant voltage E1 for the lower color temperature, a constant voltage E2 for the high color temperature and a voltage which increases proportionally to the color temperature for the intermediate color temperatures. A relationship between the color temperature and the control voltage $V_B$ becomes as indicated by a solid line in FIG. 7(C). That is, the control voltage $V_B$ has a constant voltage E3 for the lower color temperature, a constant voltage E4 for the high color temperature, and a voltage which decreases proportionally to the color temperature for the intermediate color temperatures. A center point P of a changing portion (sloping portion) in each of the control voltages $V_R$ and $V_B$ is set by the variable resistor VR1, and a width D of a changing range in each of the control voltages $V_R$ and $V_B$ is set by the variable resistor VR2.

Figure 7:
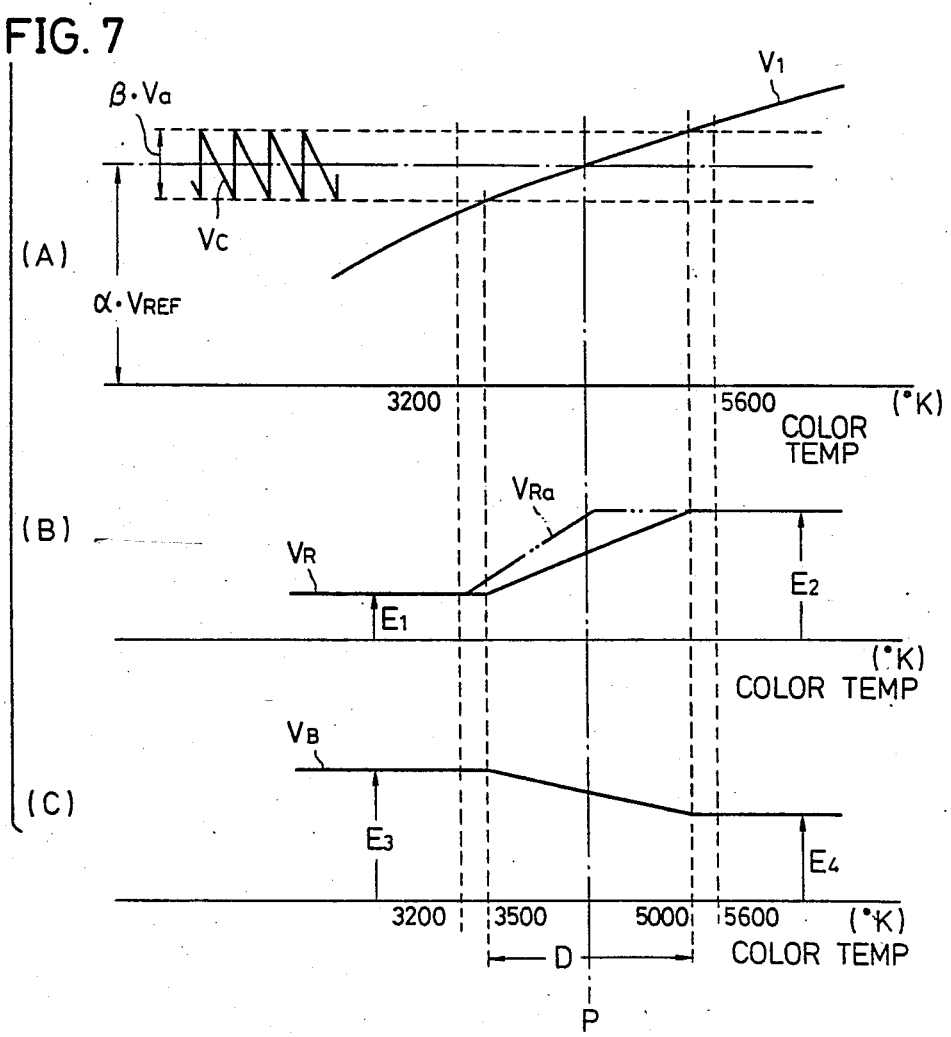
FIGS. 7(A) through 7(C) respectively show chracteristics of voltages at parts of the block system shown in FIG. 1 with respect to the color temperature.

Generally, when picking up an image by the image pickup device, the stability of the color reproducibility is more important than the strictness thereof. It is possible to obtain a stable color reproducibility which sufficiently approximates the natural colors by the color temperature setting of approximately 3200° K. for the indoor light (illumination) having a color temperature of 2600° to 3800° K., and by the color temperature setting of 5600° K. for the outdoor light having a color temperature of 5000° to 7000° K. The the changing range of width D in FIG. 7 is set to 3500° to 5000° K., for example.

When the image pickup is performed outdoors under the blue sky, the detection voltage V1 is as shown in FIG. 4(A) and the switching circuit 26 is connected to the terminals b1 and b2 responsive to the discrimination signal V2. Accordingly, the amplifications of the voltage amplifiers 15 and 16 are respectively determined by the voltages E2 and E4 which correspond to the color temperature of 5600° K. as shown in FIG. 7. For example, even when the image of a person is picked up outdoors under the blue sky against the sunlight, it is possible to prevent the face of the person from looking pale in the picked up picture. Furthermore, even when the image of the person is picked up from a low angle, it is possible to prevent the face of the person from looking reddish in the picked up picture. Therefore, it is possible to perform the image pickup outdoors and obtain a picked up picture in which the colors are extremely close to the natural colors.

On the other hand, when the image pickup is performed indoors under the indoor illumination, the detection voltage V1 is as shown in FIG. 6(A) and the switching circuit 26 is connected to the terminals a1 and a2 responsive to the discrimination signal V2. Accordingly, the amplifications of the voltage amplifiers 15 and 16 are respectively determined by the voltages E1 and E3 which correspond to the color temperature of 3200° K. as shown in FIG. 7. For example, even when the image of a person wearing a blue suit is picked up indoors under the indoor illumination, it is possible to prevent the face of the person from looking reddish in the picked up picture. Thus, it is possible to perform the image pickup indoors and obtain a picked up picture in which the colors are extremely close to the natural colors.

In the case where the image is picked up under an illumination of a fluorescence light such as a white light having a color temperature of 3800° K. and a daylight (white light) having a color temperature of 5000° K., and a mixed light source comprising an incandescent lamp and a fluorescent lamp, for example, the detection voltage V1 is as shown in FIG. 5(A) and the switching circuit 26 is alternately connected to the terminals a1 and a2 and the terminals b1 and b2 responsive to the discrimination signal V2 shown in FIG. 5(B). Accordingly, the amplifications of the voltage amplifiers 15 and 16 are respectively determined by the control voltages $V_R$ and $V_B$ which are obtained from the respective integrating circuits 31 and 32 and are within the color temperature changing range of 3500° to 5000° K. as shown in FIG. 7. The control voltages $V_R$ and $V_B$ respectively have voltages which are proportional and inversely proportional to the color temperature within the intermediate color temperature range of 3500° to 5000° K. Therefore, it is possible to perform the image pickup under the illumination having the intermediate color temperature and obtain a picked up picture in which the colors are extremely close to the natural colors.

Figure 8:
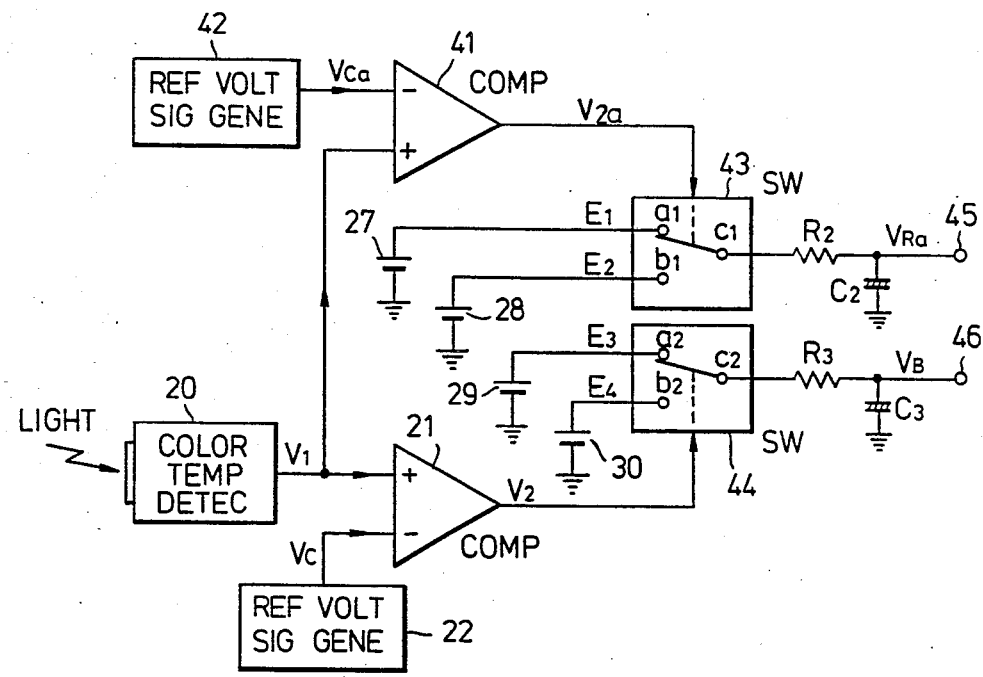
FIG. 8 is a circuit diagram showing a second embodiment of the automatic white balance adjusting circuit according to the present invention.

Next, description will be given with respect to a second embodiment of the automatic white balance adjusting circuit according to the present invention by referring to FIG. 8. In FIG. 8, those parts which are the same as those corresponding parts in FIG. 1 are designated by the same reference numerals, and description thereof will be omitted. The output detection voltage V1 of the color temperature detector 20 is supplied to non-inverting input terminals of comparators 21 and 41. A reference voltage signal Vca from a reference voltage signal generating circuit 42 having a construction identical to that of the reference voltage signal generating circuit 22 is supplied to an inverting input terminal of the comparator 41. The comparator 41 compares the detection voltage V1 and the reference voltage signal Vca and produces a discrimination signal V2a. This discrimination signal V2a is supplied to a control terminal of a switching circuit 43.

The switching circuit 43 is constituted by a part of the switching circuit 26 shown in FIG. 1 including the terminals a1, b1 and c1. The discrimination signal V2 from the comparator 21 is supplied to a control terminal of a switching circuit 44. The switching circuit 44 is constituted by a part of the switching circuit 26 shown in FIG. 1 including the terminals a2, b2 and c2. A control voltage $V_{Ra}$ is obtained via a terminal 45 and is applied to the voltage amplifier 15, while the control voltage $V_B$ is obtained from a terminal 46 and is applied to the voltage amplifier 16. In the present embodiment, a center point of a changing portion (sloping portion) in each of the control voltages $V_{Ra}$ and $V_B$ can be set independently, and a changing range of each of the control voltages $V_{Ra}$ and $V_B$ can be set independently. For example, it is possible to obtain a control voltage $V_{Ra}$ indicated by a two-dot chain line in FIG. 7(B) with respect to the control voltage $V_B$ shown in FIG. 7(C) and appropriately control the amplifications of the voltage amplifiers 15 and 16 with respect to the illumination having the intermediate color temperature.

It is possible to use as the voltage sources 27 through 30 variable voltage sources which can vary output voltages thereof. For example, it is possible to design the voltage sources 27 through 30 so that the output voltages thereof can be finely adjusted so as to make the signals Y-R and Y-B produced from the encoder 17 zero when the image of a white object is picked up.

The A.C. signal generated from the sawtooth wave signal oscillator 24 is not limited to the sawtooth wave signal, and may be a triangular wave signal, a sinusoidal wave signal and the like, for example.

Further, the present invention is not limited to these embodiments, but various variations and modifications may be made without departing from the scope of the present invention.

What is claimed is:

1. An automatic white balance adjusting circuit for an image pickup device, said image pickup device comprising a camera tube, a matrix circuit for obtaining a luminance signal and three primary color signals from an output image pickup signal of said camera tube, amplifier means for independently amplifying output signals of said matrix circuit, and an encoder for obtaining a color video signal from output signals of said amplifier means, said automatic white balance adjusting circuit comprising:
   color temperature detecting circuit means for producing a detection signal having a voltage in correspondence with a color temperature of an incoming light to said image pickup device;
   reference voltage signal generating circuit means for generating an A.C. reference voltage signal;
   comparing circuit means for obtaining a discrimination signal by comparing said detection signal with said reference voltage signal;
   a plurality of voltage source means for applying different voltages in correspondence with different color temperatures;
   selecting circuit means for selecting and obtaining voltages from the voltage source means depending on the output discrimination signal of said comparing circuit means; and
   integrating circuit means for integrating output voltage signals of said selecting circuit means,
   said integrating circuit means applying output voltage signals thereof to corresponding ones of said amplifier means to variably control amplifications thereof so that a white balance of the color video signal produced from said encoder is automatically adjusted.

2. An automatic white balance adjusting circuit as claimed in claim 1 in which said amplifier means comprises a plurality of amplifiers respectively provided for the luminance signal and the three primary color signals of red, blue and green, said integrating circuit means applying the output voltage signals thereof to two of said amplifiers provided for the two primary color signals of red and blue so as to variably control amplifications thereof.

3. An automatic white balance adjusting circuit as claimed in claim 2 in which said voltage source means comprises first and second voltage sources for producing voltages which are set with respect to first and second color temperatures which are different for one of said amplifiers provided for the primary color signal of red and third and fourth voltage sources for producing voltages which are set with respect to the first and second color temperatures for one of said amplifiers provided for the primary color signal of blue, said selecting circuit means being switched responsive to the output discrimination signal of said comparing circuit means between a first state for obtaining the voltages from said first and third voltage sources and a second stage for obtaining the voltages from said second and fourth voltage sources.

4. An automatic white balance adjusting circuit as claimed in claim 3 in which said integrating circuit means comprises a first integrating circuit for integrating one of the voltages obtained from said selecting circuit means and a second integrating circuit for integrating the other of the voltages obtained from said selecting circuit means, said first integrating circuit integrating the voltage from one of said first and second voltage sources, said second integrating circuit integrating the voltage from one of said second and third voltage sources.

5. An automatic white balance adjusting circuit as claimed in claim 1 in which said reference voltage signal generating circuit means comprises a D.C. reference voltage source, a first variable resistor coupled to said D.C. reference voltage source, an oscillator for generating an A.C. wave signal and a second variable resistor coupled to said oscillator, said first and second variable resistors having sliders thereof coupled to each other, said A.C. reference voltage signal being obtained from a connection point of said sliders.

6. An automatic white balance adjusting circuit as claimed in claim 5 in which said oscillator generates a sawtooth wave signal.

7. An automatic white balance adjusting circuit as claimed in claim 1 in which said reference voltage signal generating circuit means generates said reference voltage signal having such a peak-to-peak value depending on a color temperature detected by said color temperature detecting circuit means that the output detection signal of said color temperature detecting circuit means can take a value greater than a maximum value of said reference voltage signal, a value between maximum and minimum values of said reference voltage signal and a value smaller than the minimum value of said reference voltage signal.

8. An automatic white balance adjusting circuit as claimed in claim 1 in which said reference voltage signal generating circuit means comprises first and second reference voltage signal generating circuits, said comparing circuit means comprising a first comparing circuit supplied with output signals of said color temperature detecting circuit means and said first reference voltage signal generating circuit and a second comparing circuit supplied with output signals of said color temperature detecting circuit means and said second reference voltage signal generating circuit, said amplifier means comprising a plurality of amplifiers respectively provided for the luminance signal and the three primary color signals of red, blue and green, said voltage source means comprising first and second voltage sources for producing voltages which are set with respect to first and second color temperatures which are different for one of said amplifiers provided for the primary color signal of red and third and fourth voltage sources for producing voltages which are set with respect to the first and second color temperatures for one of said amplifiers provided for the primary color signal of blue, said selecting circuit means comprising a first selecting circuit for selectively obtaining one of the voltages from said first and second voltage sources responsive to an output discrimination signal of said first comparing circuit and a second selecting circuit for selectively obtaining one of the voltages from said third and fourth voltage sources responsive to an output discrimination signal of said second comparing circuit, said integrating circuit means comprising a first integrating circuit for integrating an output voltage of said first selecting circuit and for applying an output integrated voltage thereof to one of said amplifiers provided for the primary color signal of red and a second integrating circuit for integrating an output voltage of said second selecting circuit and for applying an output integrated voltage thereof to one of said amplifiers provided for the primary color signal of blue.

* * * * *